R. H. UHLEMANN.
LENS MOUNT.
APPLICATION FILED JULY 13, 1914. RENEWED DEC. 22, 1915.

1,191,373.                                    Patented July 18, 1916.

Witnesses:
Leo J. Dumais.
Arthur B. Framke

Inventor:
Richard H. Uhlemann.
Robert Burns
Atty.

UNITED STATES PATENT OFFICE.

RICHARD H. UHLEMANN, OF CHICAGO, ILLINOIS.

LENS-MOUNT.

1,191,373.   Specification of Letters Patent.   Patented July 18, 1916.

Application filed July 13, 1914, Serial No. 850,632. Renewed December 22, 1915. Serial No. 68,293.

*To all whom it may concern:*

Be it known that I, RICHARD H. UHLEMANN, a citizen of the United States of America, and a resident of Chicago, in the county of Cook, State of Illinois, have invented certain new and useful Improvements in Lens-Mounts, of which the following is a specification.

This invention relates to means for attaching mountings to rimless eyeglass lenses, and has for its object to provide a durable and efficient structural formation and combination of parts whereby a ready and secure fastening of the clip portion of the mounting to the lens is attained, and with which liability to gradual unfastening during continued use is avoided, all as will hereinafter more fully appear.

Figure 1:
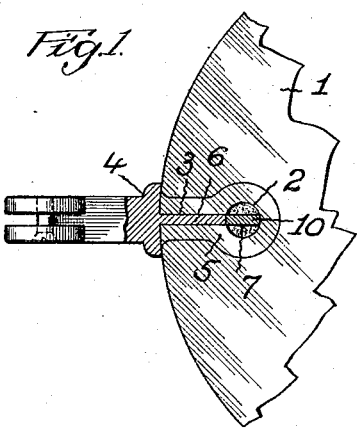
Figure 2:
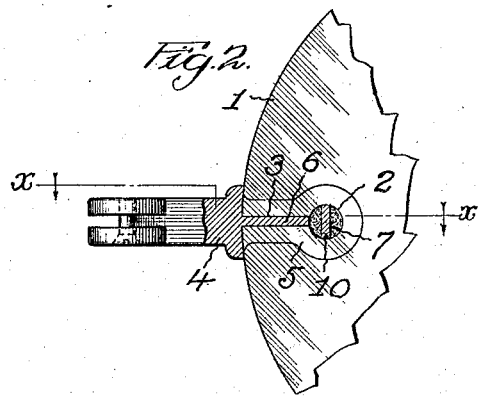
Figure 3:
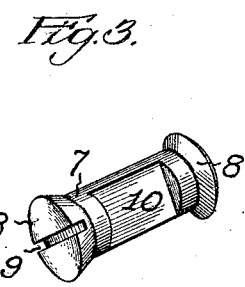
Figure 4:
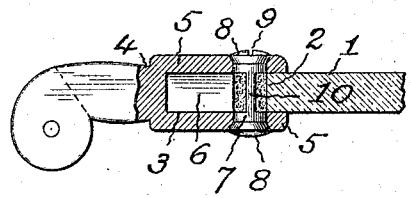
Figure 5:
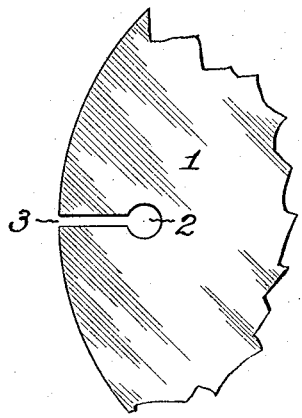

In the accompanying drawings:—Figure 1, is a sectional elevation illustrating the present invention in course of application to an eyeglass lens. Fig. 2, is a similar view illustrating the parts in a fastened condition. Fig. 3, is a perspective view of the fastening stud, detached. Fig. 4, is a detail horizontal section on line $x$—$x$, Fig. 2. Fig. 5, is an elevation of a portion of an eyeglass lens having a formation adapted to receive the present fastening.

Similar reference numerals indicate like parts in the several views.

Referring to the drawings, 1 represents an eyeglass lens formed with an orifice 2 near its margin, and with a slit 3 extending from said orifice to the margin of the lens and of a less width than the diameter of the orifice 2, as shown more particularly in Fig. 5.

4 is the clip of a mounting of any ordinary type, and which is provided with a pair of spaced attaching ears 5, between which the lens 1 fits in the usual manner. Said attaching ears 5 are in turn formed with alined orifices for the reception of the hereinafter described fastening stud. In the present improvement the clip 4, aforesaid, is provided with a central fin or web 6, disposed between the ears 5 and adapted to enter the slit 3 of the lens and have bearing therein.

7 is the fastening stud above referred to, and which is formed with heads 8, at its respective ends. Said heads have bearing against the outer surfaces of the ears 5 of the clip with a view to prevent longitudinal movement of the stud while permitting a free turning adjustment thereof.

9 is a transverse slit or other equivalent formation in one of the heads 8, of the stud, for use in effecting a turning adjustment of said stud by a screw-driver or like appliance.

A material part of the present invention consists in forming the fastening stud 7 with a flat central portion or web 10, of a thickness corresponding with that of the web 5 of the clip 4, and of a width corresponding with the diameter of the orifice 2 of the lens 1.

In the assemblage of a lens mounting and an eyeglass lens, the fastening stud 7 will be turned in the ears of the clip 4, so as to bring its flat central portion 10 in alined relation to the web 6 of the clip as illustrated in Fig. 1. As so adjusted the flat central portion 10 of the stud is capable of being introduced through the slit 3 into the orifice 2 of the lens, after which and by a quarter-turn of the stud, said flat portion 10 is brought into right-angle relation to the aforesaid web 6, to lock the clip in place against a retrograde movement.

While the present invention is capable of use as a mechanical fastening, *per se*, it is preferable to use in connection therewith an intermediate filling of shellac cement, to aid in the attachment of the parts, as well as to prevent accidental turning movement of the fastening stud 7 from its locking adjustment above set forth.

Having thus fully described my said invention what I claim as new and desire to secure by Letters Patent, is:—

1. A lens mount comprising a clip having orificed side ears, and a fastening stud journaled in said ears and formed with a flat central portion, the parts being adapted for engagement with a lens formed with an orifice near its margin and with a slit connecting said orifice with the margin of the lens, substantially as set forth.

2. A lens mount comprising a clip having orificed side ears, and a fastening stud journaled in said ears and formed with a flat central portion and with headed ends, the parts being adapted for engagement with a lens formed with an orifice near its margin and with a slit connecting said orifice with the margin of the lens, substantially as set forth.

3. A lens mount comprising a clip having orificed side ears and a central web intermediate of said ears, and a fastening stud journaled in said ears and formed with a flat central portion, the parts being adapted for engagement with a lens formed with an orifice near its margin and with a slit connecting said orifice with the margin of the lens, substantially as set forth.

4. A lens mount comprising a clip having orificed side ears and a central web intermediate of said ears, and a fastening stud journaled in said ears and formed with a flat central portion and with headed ends, the parts being adapted for engagement with a lens formed with an orifice near its margin and with a slit connecting said orifice with the margin of the lens, substantially as set forth.

5. A lens mount comprising a clip having orificed side ears, and a fastening stud journaled in said ears and formed with a flat central portion, the parts being adapted for engagement with a lens formed with an open sided orifice near its margin, substantially as set forth.

Signed at Chicago, Illinois, this 7th day of July, 1914.

RICHARD H. UHLEMANN.

Witnesses:
ROBERT BURNS,
WM. R. UHLEMANN.

Copies of this patent may be obtained for five cents each, by addressing the "Commissioner of Patents, Washington, D. C."